May 14, 1929. M. JAEGER 1,712,499
GLASS PRESSING MACHINE
Original Filed April 17, 1922 16 Sheets-Sheet 3
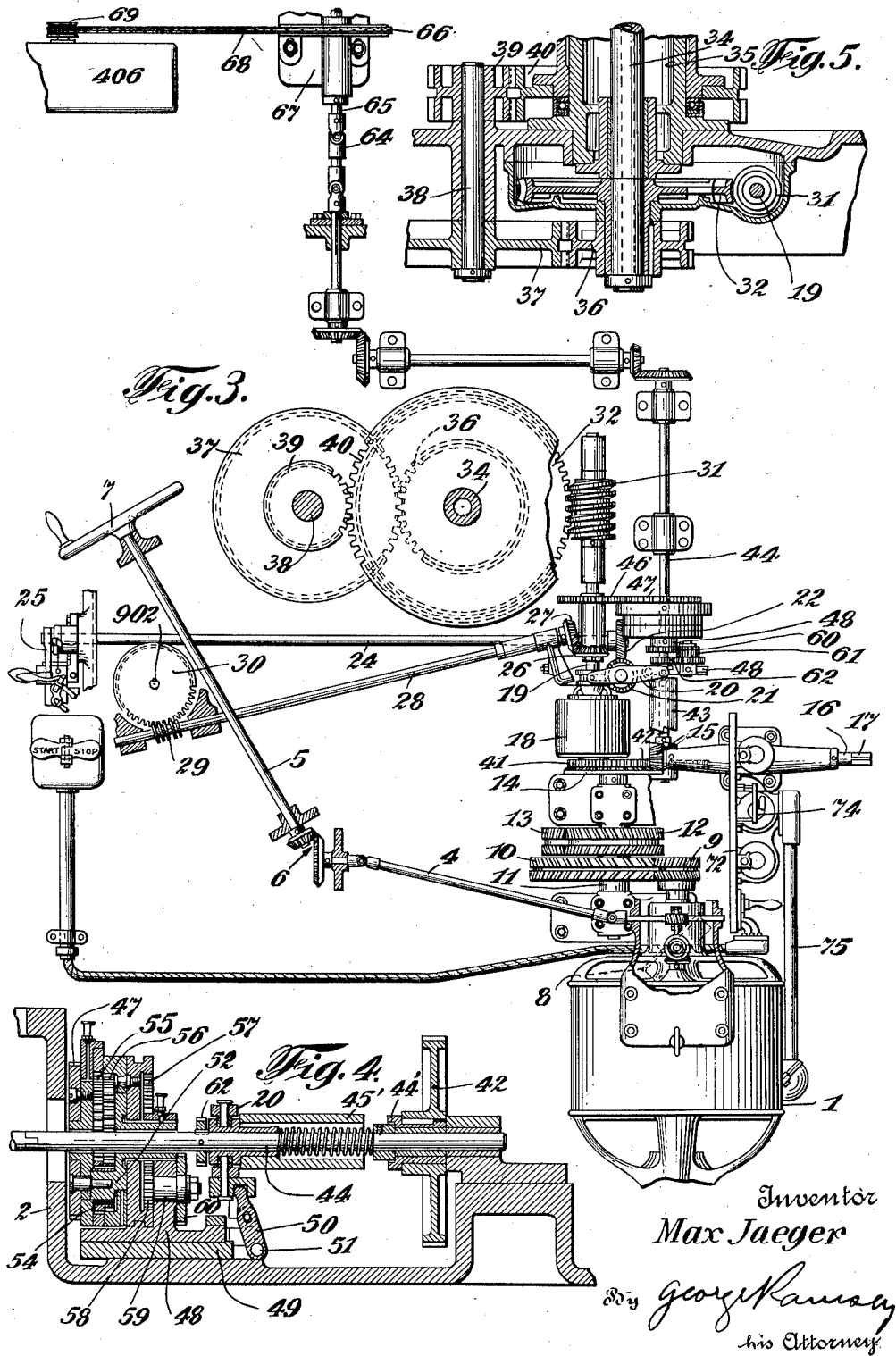

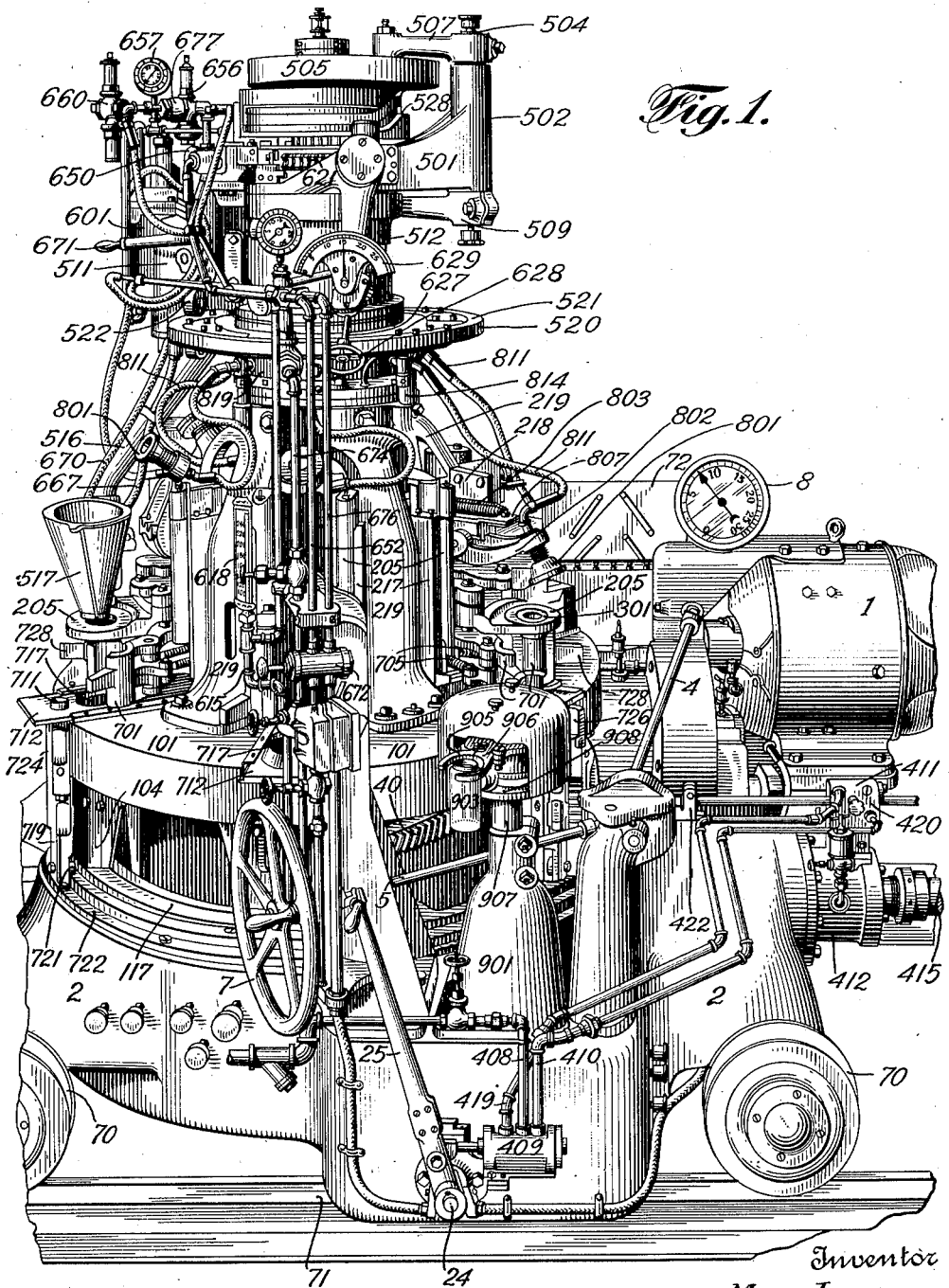

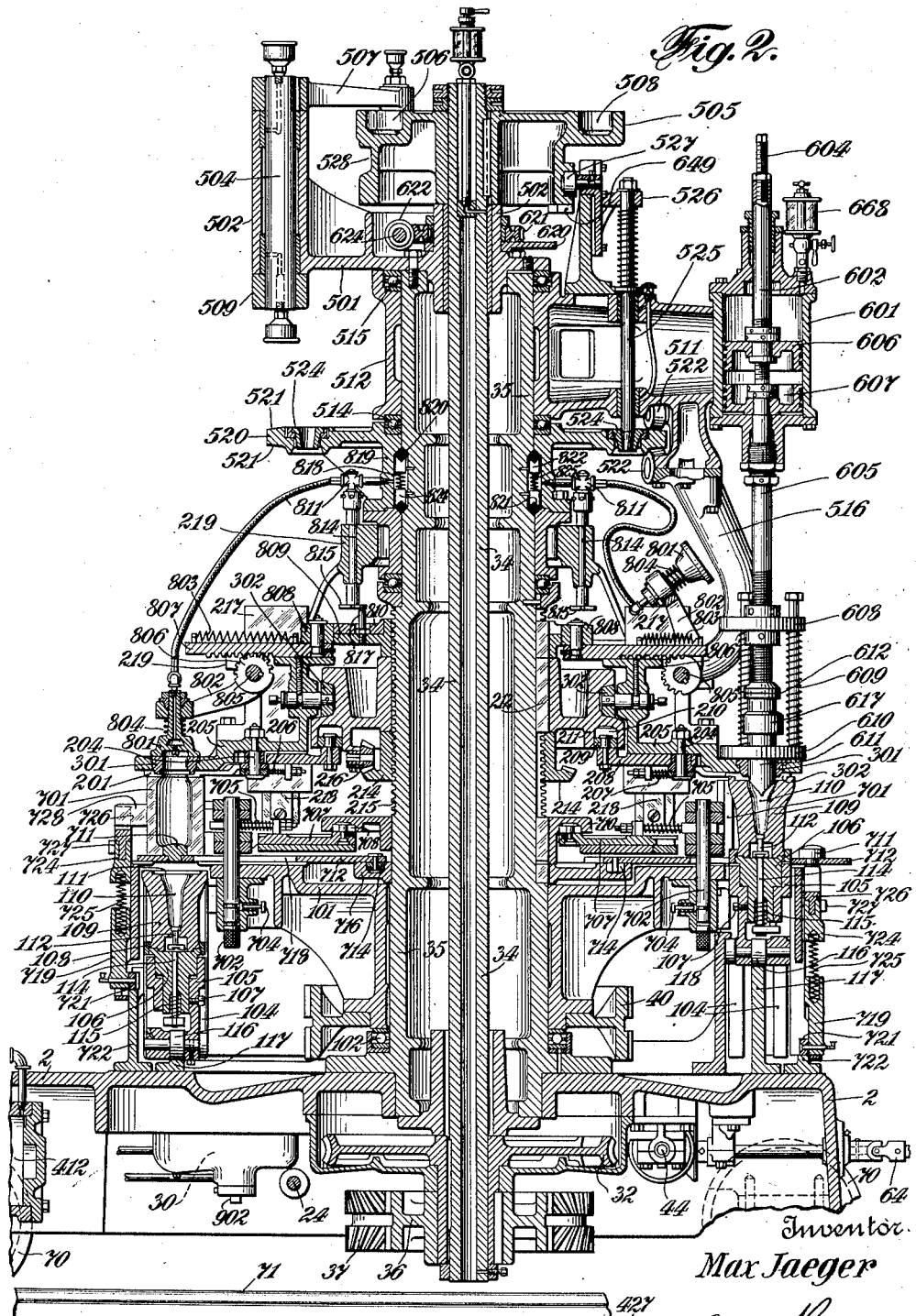

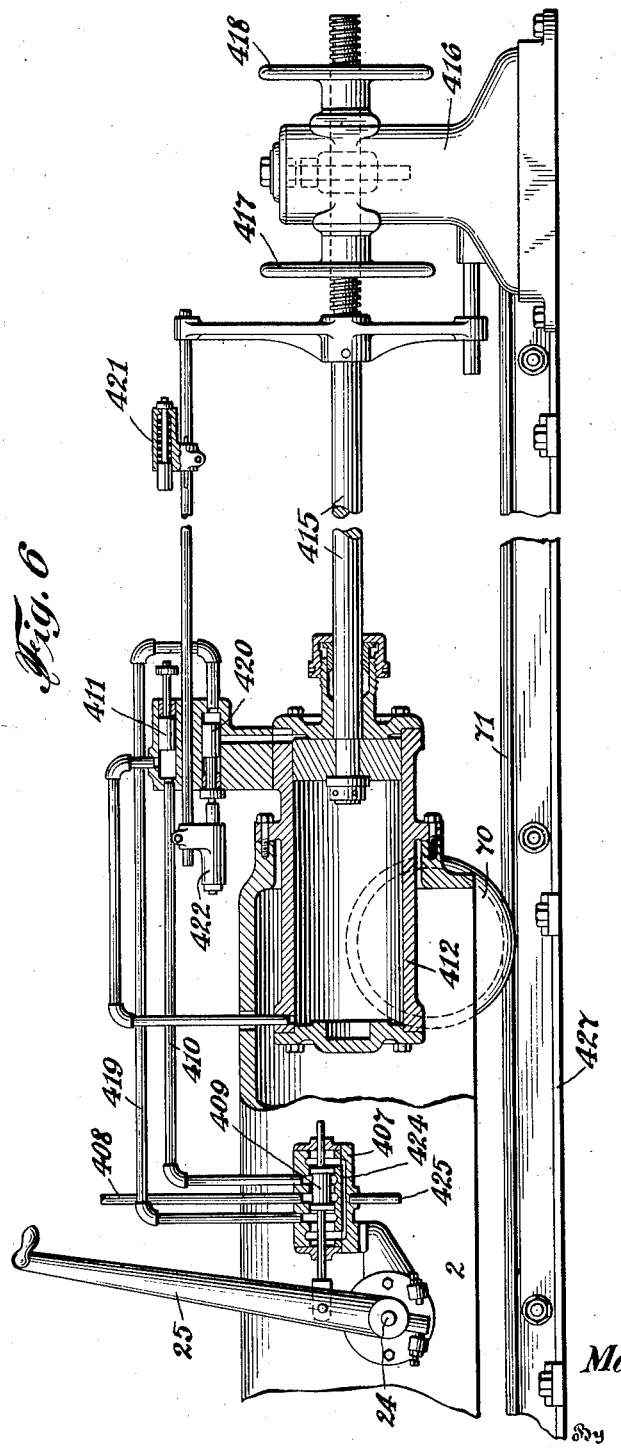

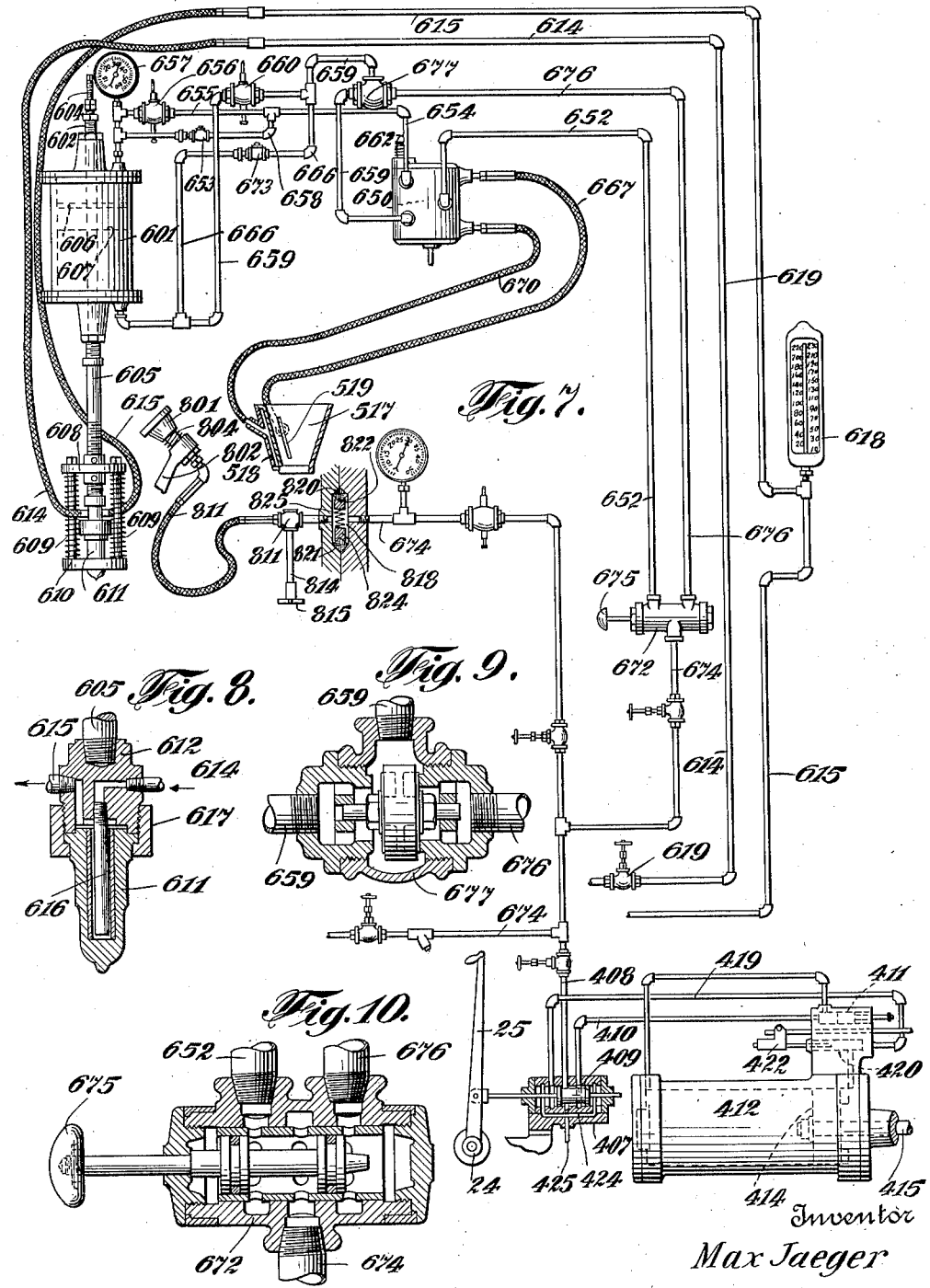

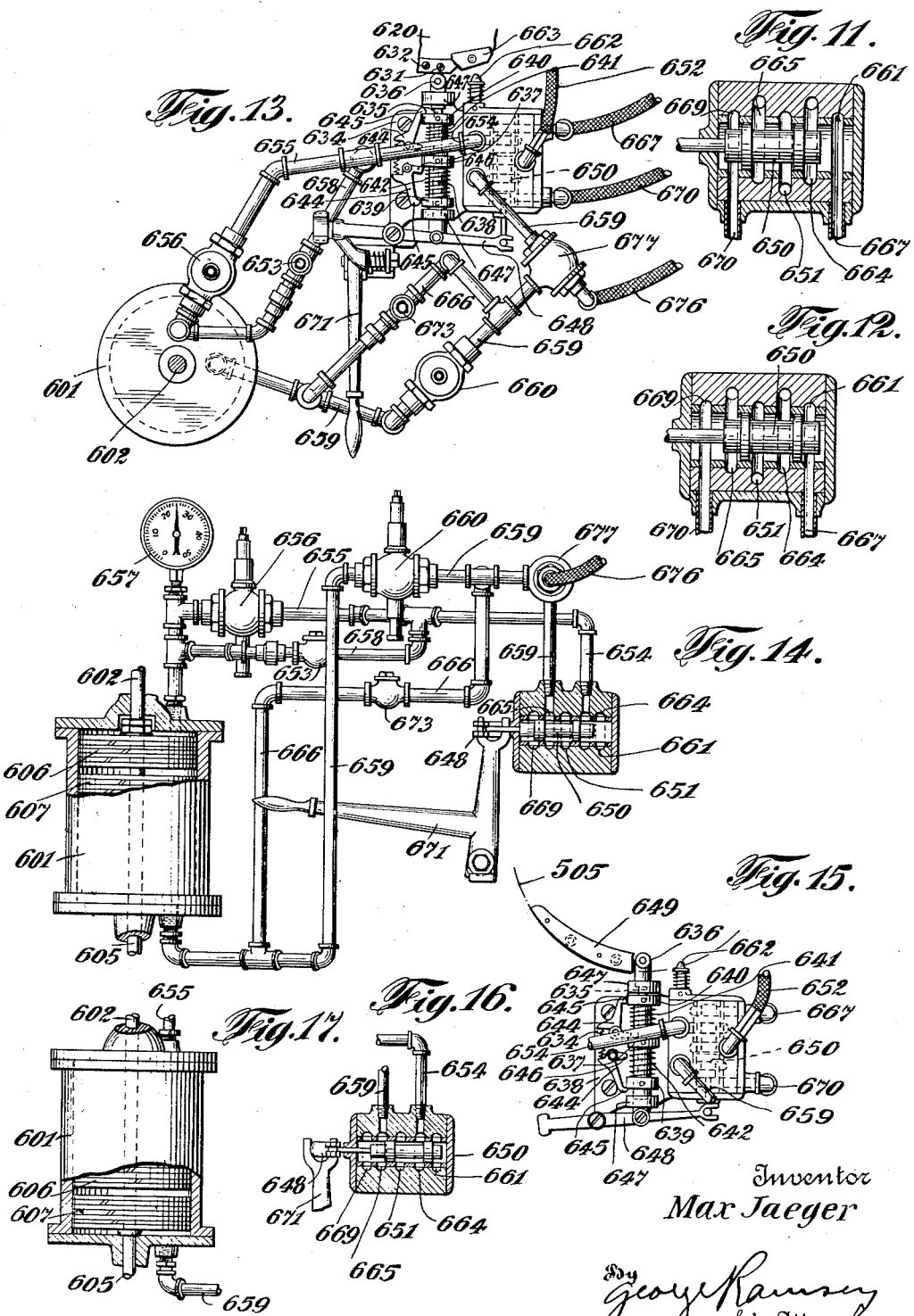

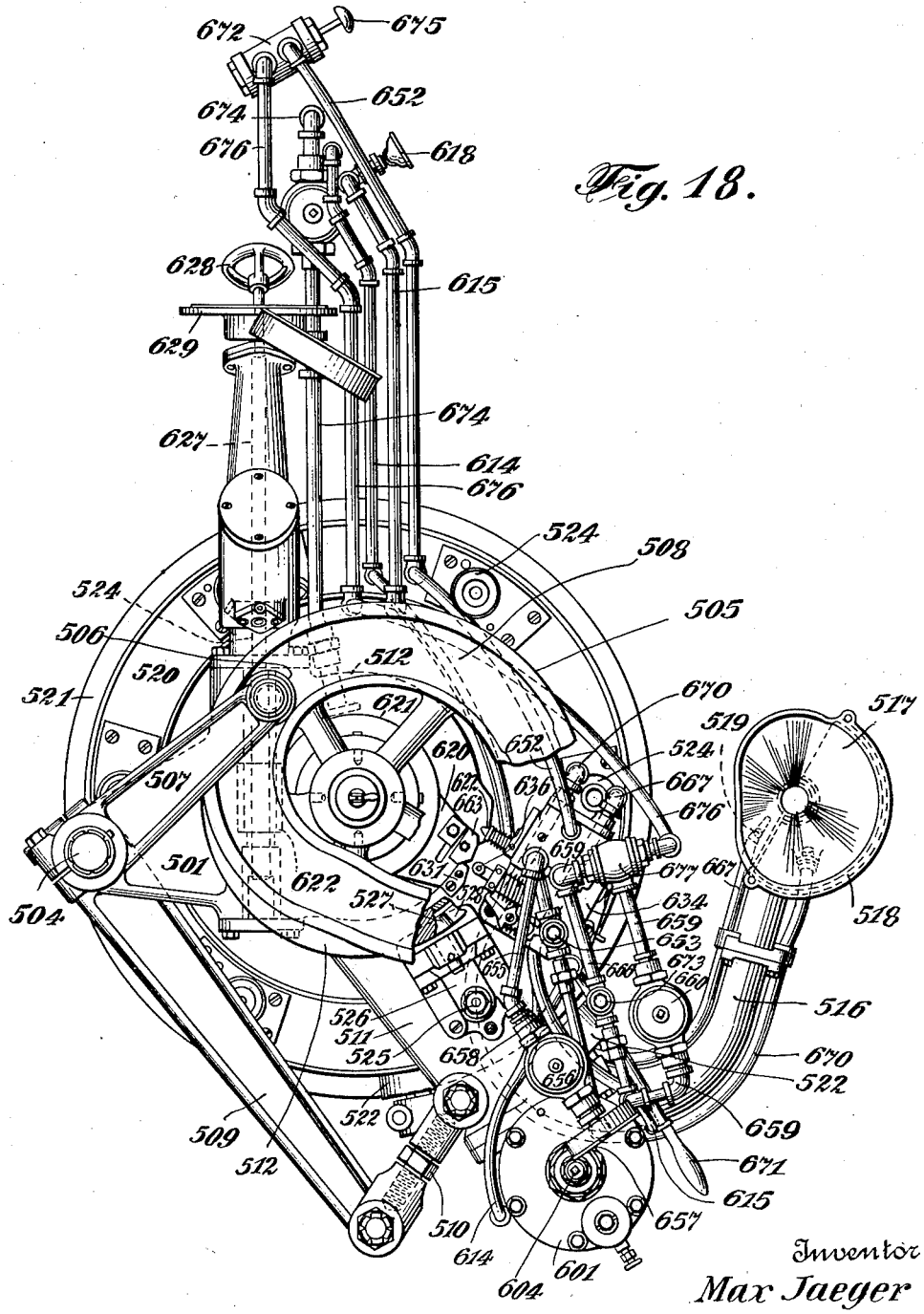

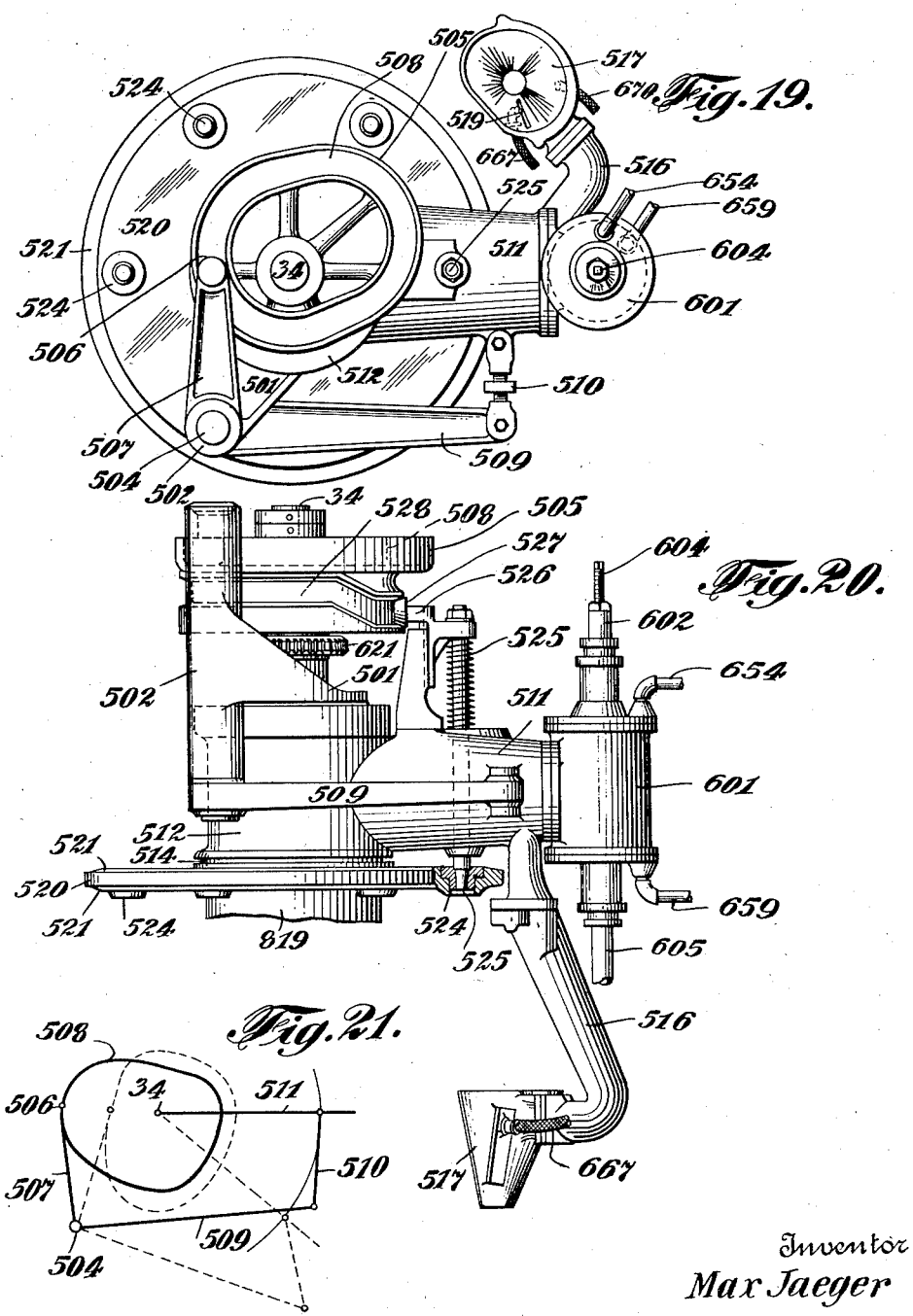

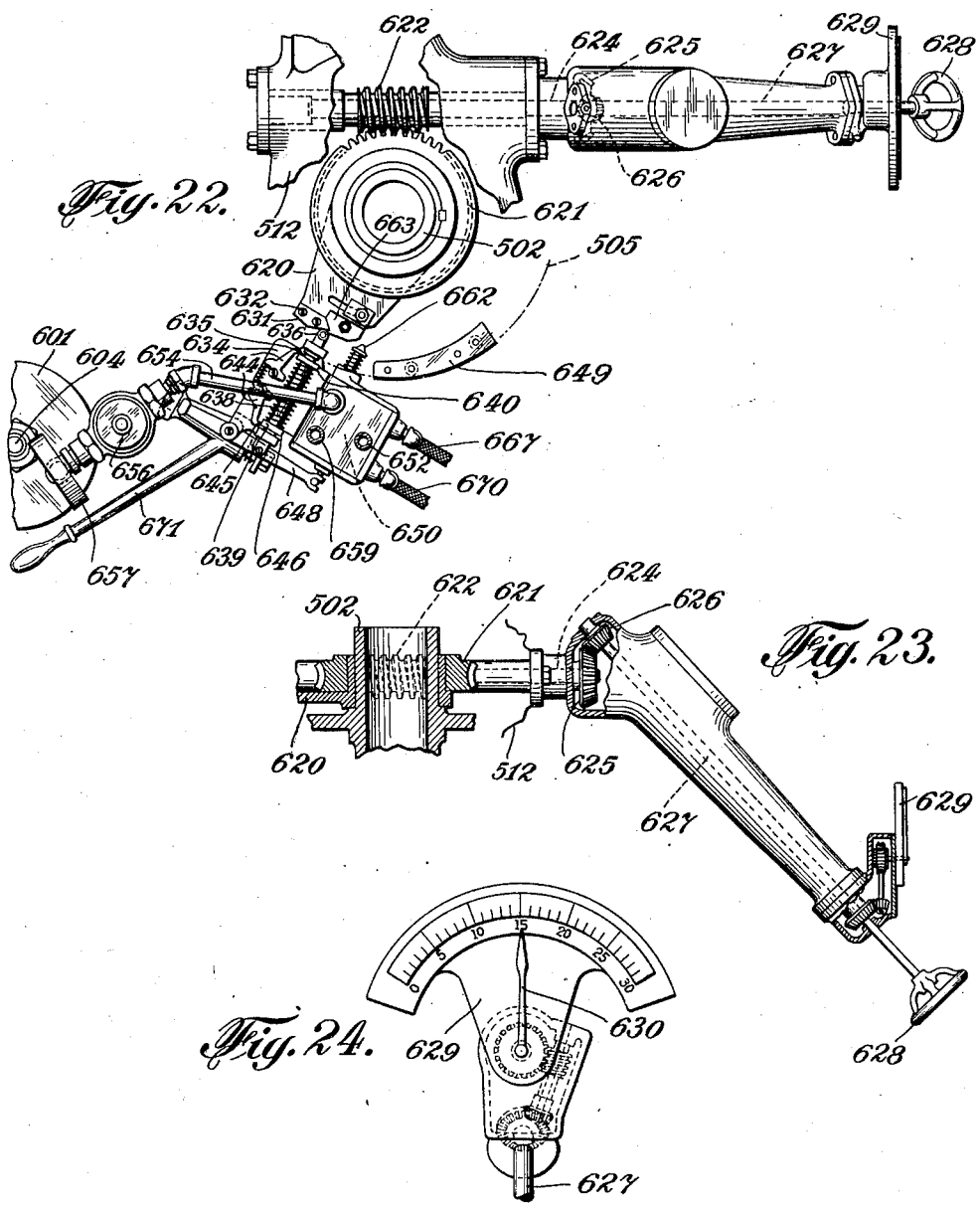

May 14, 1929.  M. JAEGER  1,712,499
GLASS PRESSING MACHINE
Original Filed April 17, 1922   16 Sheets-Sheet 10
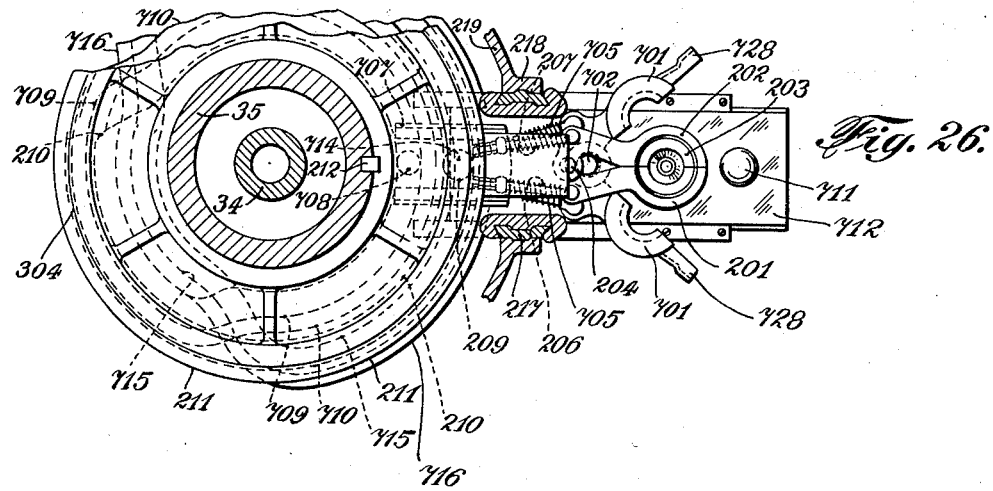
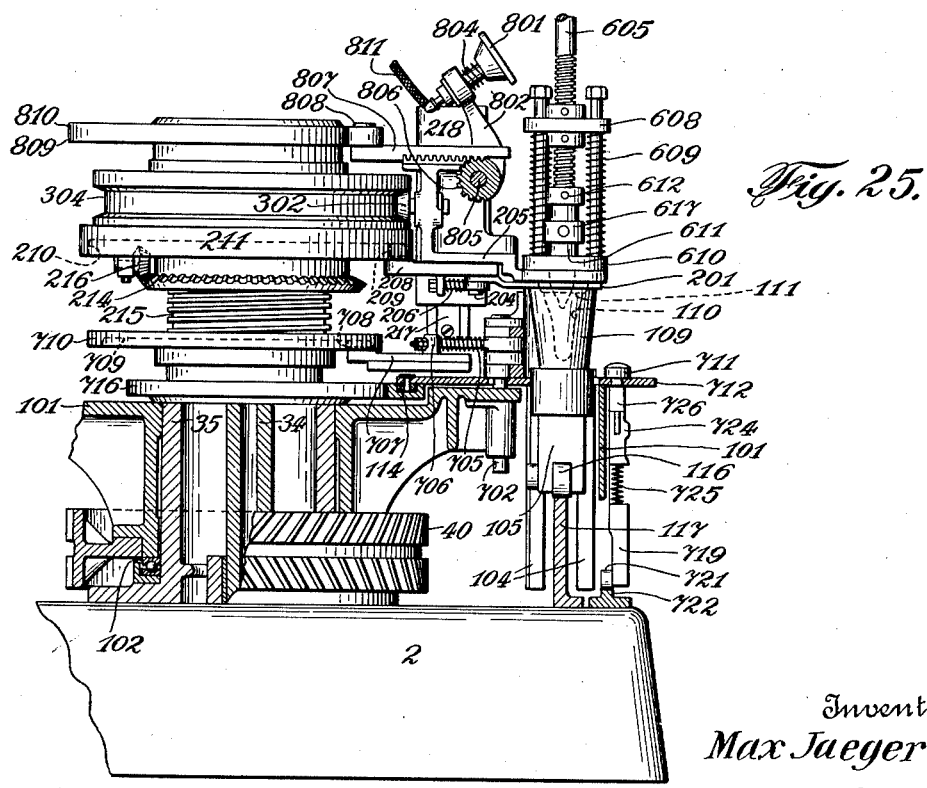
Inventor
Max Jaeger
By George Ramsey
his Attorney May 14, 1929.  M. JAEGER  1,712,499
GLASS PRESSING MACHINE
Original Filed April 17, 1922  16 Sheets-Sheet 11

Fig. 27.

May 14, 1929.  M. JAEGER  1,712,499
GLASS PRESSING MACHINE
Original Filed April 17, 1922   16 Sheets-Sheet 12

Inventor
Max Jaeger
By George Ramsey
his Attorney

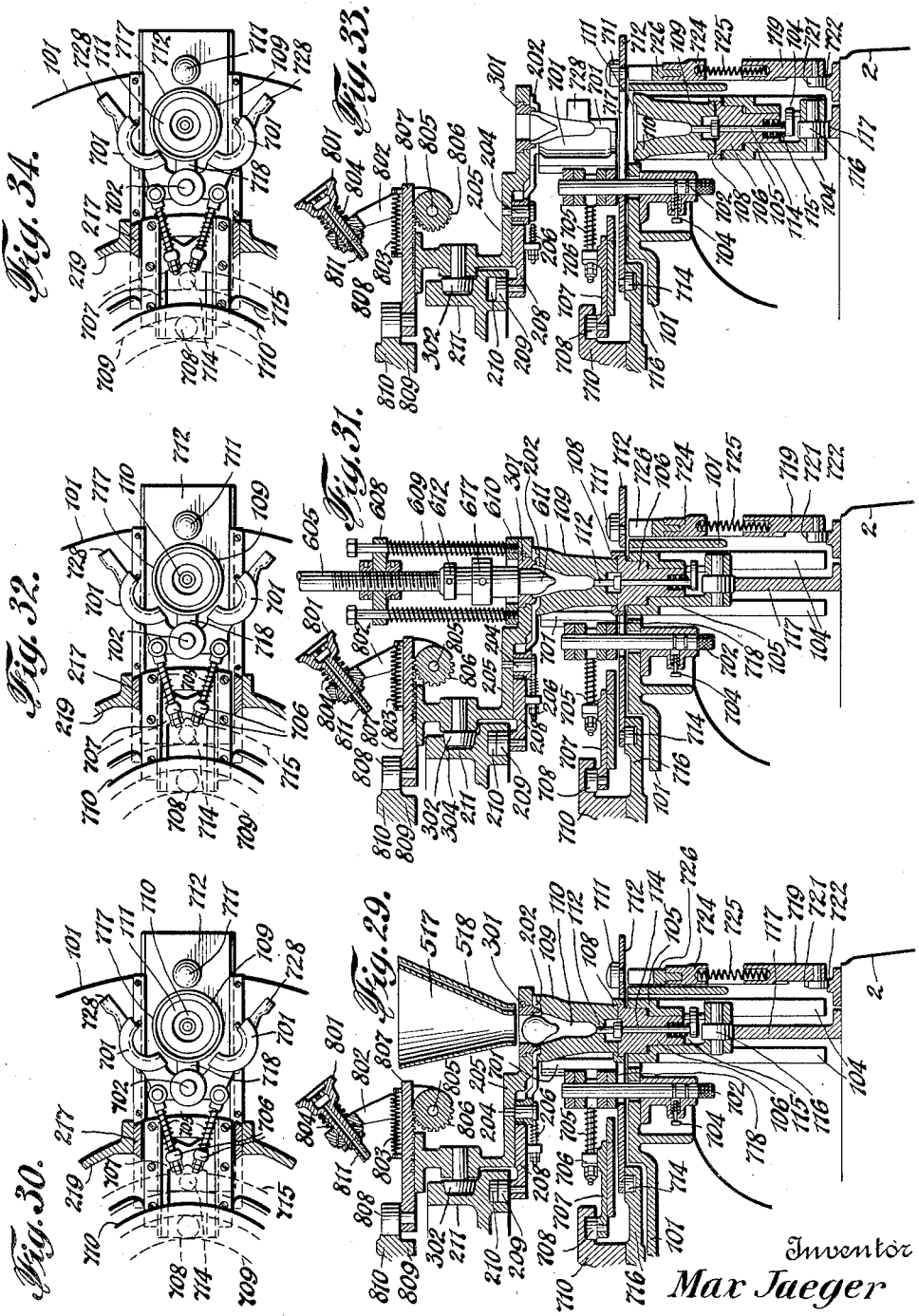

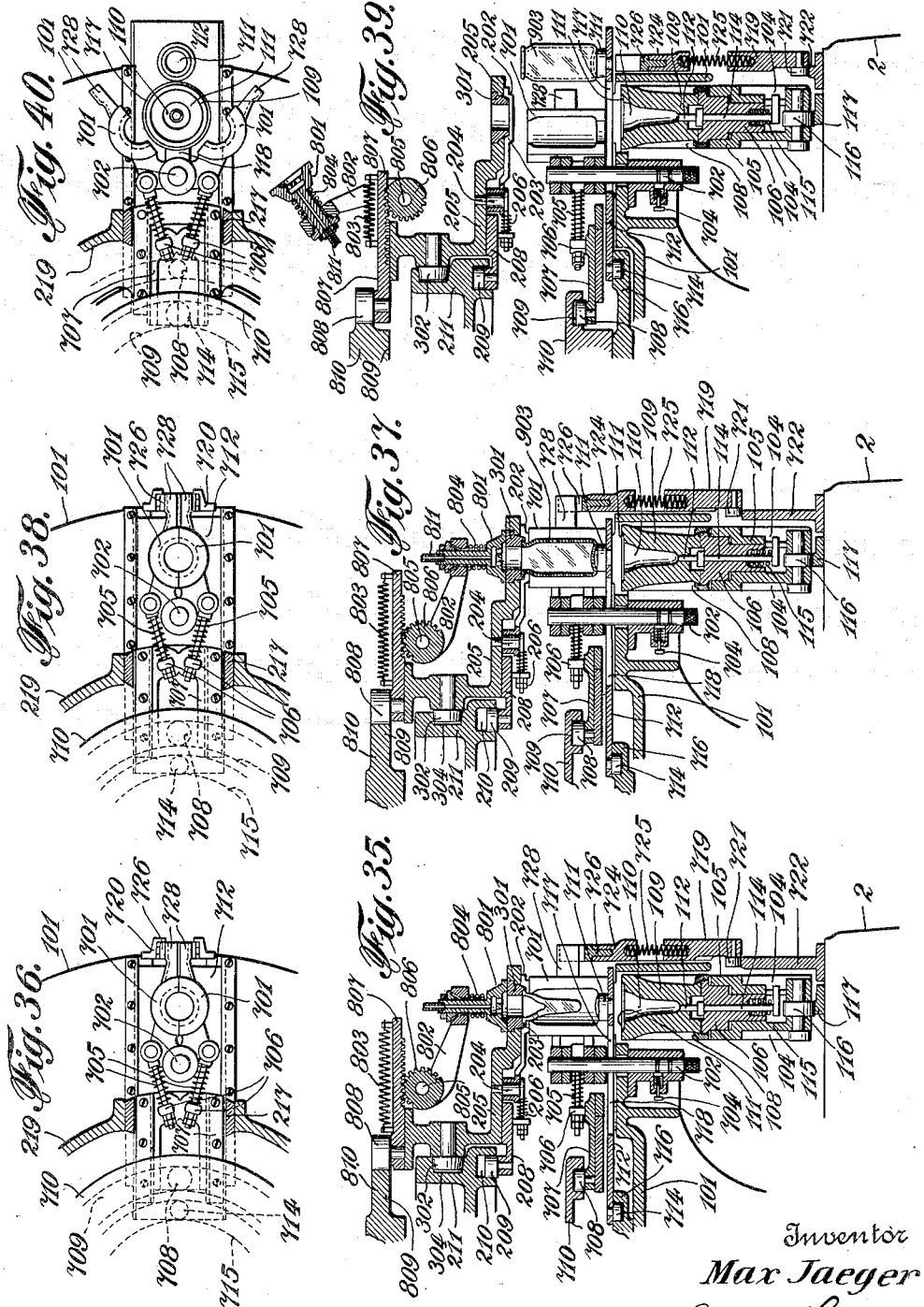

May 14, 1929.  M. JAEGER  1,712,499
GLASS PRESSING MACHINE
Original Filed April 17, 1922   16 Sheets-Sheet 15
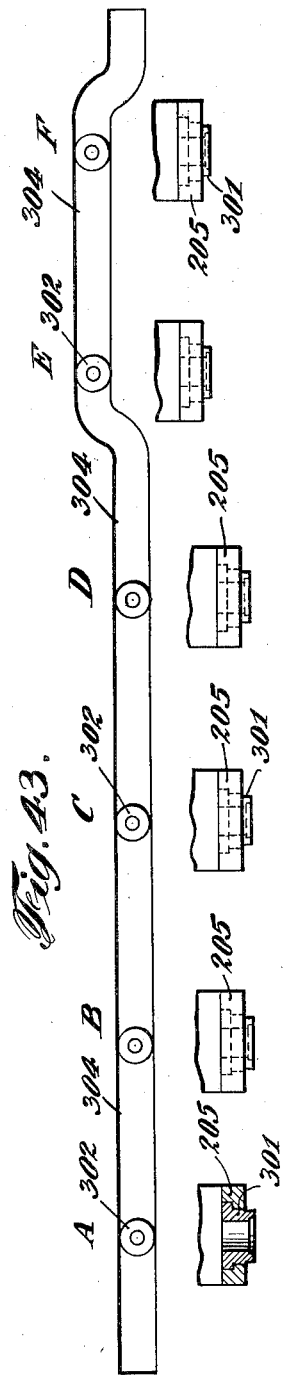
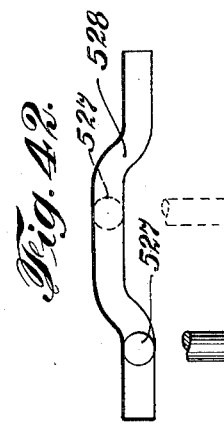
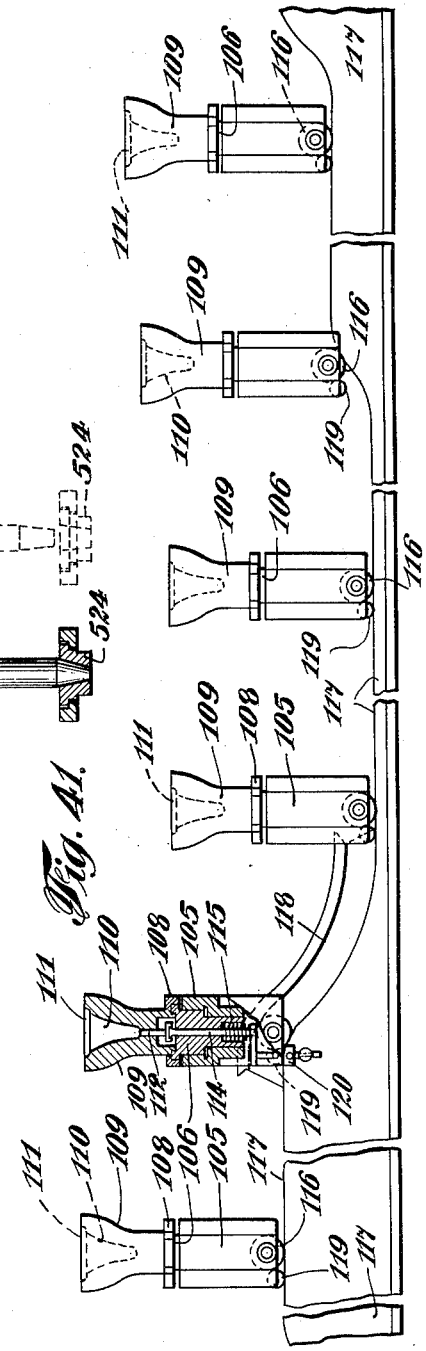
INVENTOR
Max Jaeger
BY George N Ramsey
his ATTORNEY

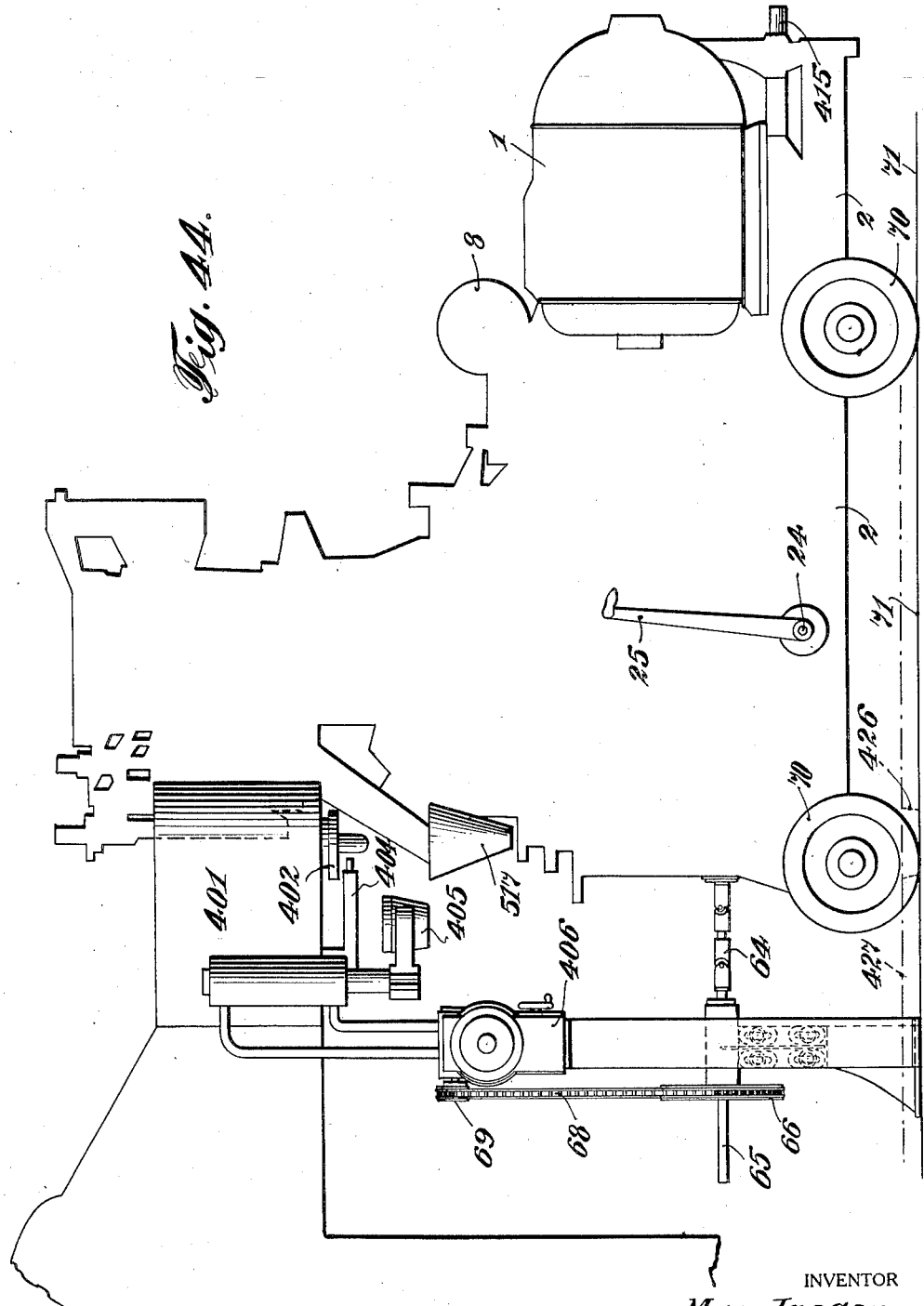

Patented May 14, 1929.

1,712,499

UNITED STATES PATENT OFFICE.

MAX JAEGER, OF LONG ISLAND CITY, NEW YORK, ASSIGNOR TO ANCHOR CAP & CLOSURE CORPORATION, OF LONG ISLAND CITY, NEW YORK, A CORPORATION OF NEW YORK.

GLASS-PRESSING MACHINE.

Original application filed April 17, 1922, Serial No. 553,900. Divided and this application filed July 31, 1924. Serial No. 729,263.

This invention is a division of my application Serial No. 553,900 filed April 17, 1922, and relates to the glass art and more especially to an automatic pressing machine.

Heretofore in the art the most common type of presses has been of the stop and start type; that is, the mold table had an intermittent movement so that the whole mass of metal, comprising all the revolving parts of the machine, was stopped and started for each piece of ware manufactured. This motion imposed a very heavy duty upon the driving mechanism as well as on the press, because of necessity these very heavy parts had to be started, moved, and stopped at very small intervals of time when a machine was delivering many pieces of finished glassware per minute. This stopping and starting rendered the load condition on the driving forces very unsatisfactory because at one time there was no load,—as when the press is stationary,—and at the next instant the load was exceedingly heavy. If several machines were operating in unison this load disturbance was pyramided. Since several machines other than presses were usually run from the same driving plant this variable load factor disturbed the operation of other machines, unless the operating power was so powerful as to be inefficient and wasteful in operation. The jerky motion also jerked the glass charges around in the mold and under certain conditions introduced defects in the ware. Furthermore, such a type of machine naturally required constant repairs because of loosening of parts and breakage.

It has also been the practice in the art to provide complicated mechanisms for transferring the charge from the press mold to the blow mold. In many cases this was done by an inversion method where the charge was inverted either in one step or the other. This was liable to change the shape and condition of the glass and produce defects in the ware. Various types of split press molds have been in use but these molds leave seams in the finished ware where the split press mold parts meet. This is due to the very sensitive character of the glass when it leaves the feeder and before a thick skin is formed on the charge. Furthermore, complex transferring mechanisms increase the weight of moving parts and slow up the machine.

Where automatic feeders have been used it has been the practice to drive the feeder independently of the press. This has made it necessary to coordinate two separately driven machines to secure a common timing for the interval when the glass is delivered from the feeder to the press. There are times when it is necessary to change the rate of the feeder and there are times when it is desirable to change the rate of the press. These changes may be desirable simultaneously, or, either the press or the feeder may require the change. However, in any case where a change is made in either the feeder or the press as to the rate of charges delivered or the rate of finished ware produced, a corresponding change must be made in the other machine. Where the two machines have independent drives any change requires double manipulation and adjustments which must properly time the feeder and press at the new rate before ware can be made.

The machine embodying the invention hereinafter specified comprises a continuously rotating mold table having a constant speed of rotation, except when the speed is changed for adjustments, and wherein the feeding, pressing, blowing, and delivering operations are all performed without in any way changing the speed of rotation of the machine. Under these conditions the load is very even and the machine operates with minimum shock and jars. The power consumed is very light and since no abnormal load is produced a constant and efficient drive is the result.

The charge transferring devices are simple and are so located that the charge is not disturbed or marred during or after pressing. The parts are compact and therefore the machine occupies small floor space.

The machine embodying the present invention may be generally described as comprising a base frame upon which all the mechanisms except the feeder are mounted. This base frame carries a central column which is a mast around which the machine is built. The mold table revolves around this column and carries press molds and blow molds. The press molds rise through the mold table between the members of split blow-molds and receive the glass charge which is dropped from the feeder into a funnel that at the feeding moment is moving clockwise with the mold. When the mold is fed the funnel leaves the mold and moves counter-clockwise to a point slightly beyond the path of the falling charges, where the funnel is positioned over the next mold in the series and the cycle of feeding is repeated when the mold comes under the feeder. A pressing plunger which travels with the funnel is positioned over the mold previously charged when the funnel is positioned over the succeeding mold. Suitable ring molds are brought into cooperation with the press mold before the plunger descends. During the pressing operation the plunger and funnel both travel with their respective molds. In the machine there are a plurality of groups of mold members carried by the mold table and but one funnel and one plunger to serve these molds. The mold table, therefore, continuously rotates while the funnel and plunger oscillate. When the pressing operation is completed the neck of the ware is formed to overhang a split ring mold and then the plunger rises and the solid block pressing mold descends, leaving the charge suspended from the neck ring mold. After the descent of the pressing mold a slide brings the bottom of the blow mold into place beneath the charge and a blow mold then closes around the charge. A blow head descends upon the ring mold and air is admitted to the blow head, thereby blowing the charge into a finished article. The blow head then rises slightly and continues to blow cool air into the blown article, thereby gently cooling the hot glass. The blow mold now opens, the bottom slide moves out and carries outwardly the finished piece of ware. An automatic take-off comprising a pair of spring operated jaws then grasps the ware and removes the ware from the slide by a combined circular and lifting motion so that the ware is elevated slightly as it is removed from the bottom of the blow mold. At the next station the press mold rises and the cycle is repeated. In the machine herein disclosed there are six mold stations on the mold table and six cycles performed during one complete rotation of the mold table.

Realizing that the present invention may be embodied in constructions and devices other than those herein described and shown it is desired that the disclosure shall be considered as illustrative and not in the limiting sense.

Referring now to the drawings forming a part of this specification, like characters will be used through the several figures to represent like parts.

Figure 1 is a perspective view of the machine;

Figure 2 is an elevational section view;

Figure 3 is a plan view of the driving shafts;

Figure 4 is a detail view of the clutch mechanism;

Figure 5 is a detail view of the drive to the vertical main shaft;

Figure 6 is a detail view of the mechanism for withdrawing the press from position beneath the feeder;

Figure 7 is a layout of the control pipes;

Figure 8 is a sectional view through the plunger;

Figure 9 is a detail view of a reducing valve;

Figure 10 is a detail view of a control valve;

Figures 11 and 12 are sectional views of the control valve for the press plunger;

Figure 13 is a plan view of the pipe connections to the pressing cylinder;

Figure 14 is an elevational view of the parts shown in Figure 13;

Figure 15 is a detail of the operating cam for the control;

Figure 16 is a detail of the control valve shown in Figures 11 and 12 and illustrates the service pipe connections;

Figure 17 shows the pressing cylinder;

Figure 18 is a plan view of the pipe lines and the guiding funnel;

Figure 19 is a plan view of the funnel cam and pressing plunger;

Figure 20 is an elevational view of the parts shown in Figure 19;

Figure 21 is a diagrammatic view of the movements of the plunger and the guiding funnel;

Figure 22 shows the adjustments for the control cam;

Figure 23 is an elevational view of the detail shown in Figure 22;

Figure 24 illustrates the indicator scale for the control adjustments;

Figure 25 is a detail showing the presser plunger in operation;

Figure 26 is a plan view of a single mold showing the ring mold closed and the blow mold open;

Figure 27 is a diagrammatic view of the ring mold and cam therefor;

Figure 28:
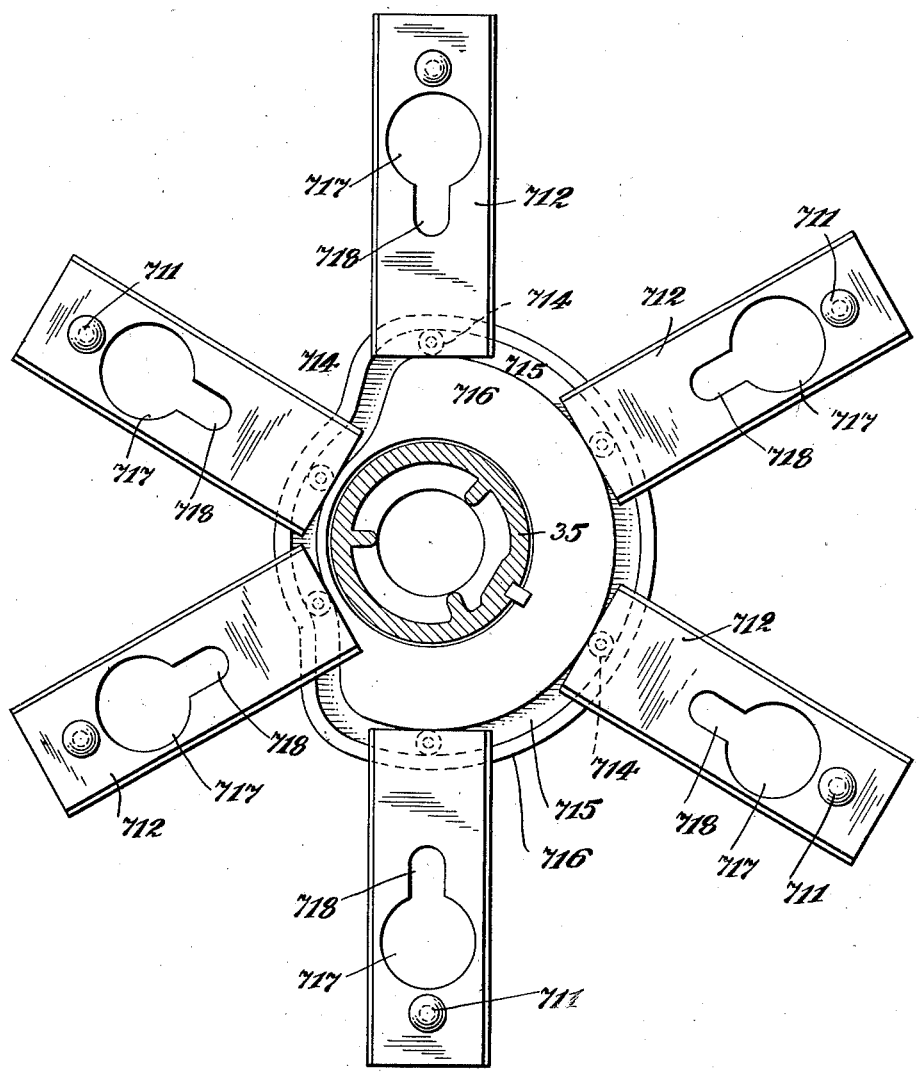
Figure 28 is a diagrammatic view of the slide plate and cam therefor.

Figures 29 to 40 inclusive are alternate plan and corresponding elevational views of a complete cycle of a single mold from receiving the charge to discharging the completed ware;

Figure 41 is a view showing a complete cycle of movement of a press mold;

Figure 42 illustrates the cam for operating the locking pin to lock the press mold directly under the press plunger;

Figure 43 is a detail of the solid ring lifting cam; and

Figure 44 is a diagrammatic view showing the shaping mechanism and the driving connection to the glass feeder.

Reference will now be made to specific constructions embodying the invention which will be described in detail.

Main drive and main frame.

In view of the fact that it is desirable to be able to regulate the speed of operation of the machine, it is necessary that a variable speed drive be provided and this is accomplished by means of a variable speed motor 1 which is mounted on the main frame 2 and is connected by shafts 4 and 5 together with suitable connecting gearing 6 with a control wheel 7 so that the field of the motor may be controlled in such manner as to obtain a relatively large range of speed. The particular speed for which the motor is set to run is indicated on the dial 8 which faces the control handle wheel so that an operator manipulating the wheel may observe the needle on the dial to determine the speed at which the motor is being set to run.

The motor shaft carries a pinion 9 which meshes with a gear 10 that is mounted on the stub shaft 11. A gear 12 on the stub shaft 11 is in engagement with a gear 13 on a front section of the main shaft. The stub shaft 11 also carries bevel gear 14 which meshes with the bevel pinion 15 on the hand driven shaft 16 which permits the operator to place a crank on the squared portion 17 and thereby turn the machine by hand when desired. The hand driven mechanism runs idly when the machine is driven by the motor. The front section of the main shaft carries one half of a disk clutch member 18 and the main drive shaft 19 carried the other half of the disk clutch. This disk clutch is adapted to be operated by the lever 20 which is operated by pinions 21 and 22 on the control shaft 24 which carries the main control hand lever 25 so that when this lever is operated the disk clutch may be opened or closed to connect or disconnect the main shaft 19 from the motor drive. The main shaft carries a bevel pinion 26 which connects with a corresponding pinion 27 on the shaft 28 that carries a worm 29 which drives the worm wheel 30 that operates the take-off mechanism.

The main drive shaft 19 also carries a large worm 31 that engages the main drive worm wheel 32 that is mounted on the vertical main shaft 34. Referring to Figures 2 and 5 it will be noted that the vertical main shaft extends upwardly through the column 35 which is fixedly mounted upon the main frame 2. The vertical main shaft 34 carries a reduction gear 36 that meshes with a larger gear 37 on the vertical countershaft 38 which also carries on its upper end a pinion 39 that engages a mold table drive gear 40 so that the mold table is continuously rotated when the main shaft 19 is driven.

Referring now to Figures 3 and 4, it will be noted that the front main shaft which rotates whenever the motor is running, carries a gear 41 which engages a gear 42 on the glass feeder shaft 44. This gear 42 carries one part of a simple spiral clutch 44'—45'. The main drive shaft 19 runs at a relatively high speed as compared to the speed necessary to operate the timer for the glass feeder to enable the feeder to deliver glass at the proper rate for the press. When the press is stopped and withdrawn from the feeder, as will later be explained, it is desirable to run the feeder at a higher rate so that small charges will be dropped in a suitable cullet trough. When the press is operating, however, and the drive for the press is driving the feeder, it is desirable to take the power for the feeder from a high speed main shaft, thus avoiding irregularities in speed which might be due to press operation, and a reduction gearing is introduced as a means for obtaining the proper speed for the feeder control drive. This is accomplished (Figures 3 and 4) by the gear 46 on the main drive shaft 19 which meshes with a gear 47 on the slidable frame 48, that slides upon the base 49 when the clutch lever 20 is actuated because this clutch lever 20 is connected to the frame 48 by a lever 50 of the second class which is pivoted at 51 to the base 49. The gear 47 is connected to a revolving head 52 mounted to revolve on the shaft 44. This head carries planetary gears 54, the larger of which meshes with the stationary annular gear 55 and the smaller of which meshes with the annular gear 56 that is attached to the outside annular gear 57. A pinion 58 is carried by the short shaft 59 mounted in the frame 48, which shaft carries another pinion 60 on its outer end. This pinion 60 meshes with the small pinion of the double reduction gear 61 that is also mounted upon the frame 48. The larger member of the double reduction gear 61 meshes with a pinion 62 secured to the shaft 44. By this construction it will be noted that when the clutch lever 20 is operated to open the disk clutch the positive clutch 44'—45' drives the feeder shaft 44 and the frame 48 has been moved forward to disengage the gear 46 from meshing with the gear 47. However, when the clutch lever 20 is operated to close the disk clutch then the positive clutch 44'—45' is opened and the gears 46 and 47 are in mesh. Power from the main shaft 19 is transmitted to the gear 46 and from it to the gear 47, which drives the revolving head 52 and causes the planetary gears to travel around the stationary annular gear 55. This motion causes the planetary gear to transmit a slow speed to the annular gear 56 dependent upon the ratio of teeth in these several gears. Power is then transmitted from the annular gear 57 through the gears 58, 59, 60 and 61 to the pinion 62 on the feeder shaft 44. This feeder shaft is formed in several sections connected together with pairs of bevel gears and finally is connected by a universal coupling 64 with a shaft 65 that extends parallel to the track of the machine. This shaft 65 has a sliding key drive engagement with the sprocket wheel 66 that is secured to the stationary post 67. The sprocket carries a silent chain 68 which drives the feeder sprocket 69. This chain drive, operated by the sliding shaft, permits the machine to be withdrawn from beneath the feeder without breaking the drive to the feeder.

The main frame 2 rests upon track wheels 70, which are adapted to roll upon rails 71 so that the machine may be moved toward or from the feeder, as is necessary or desired. It will also be noted that the switchboard 72 adjacent the motor is connected to the control switch 74 for the motor by suitable conduit 75.

Mold table and block mold.

The press or parison mold mechanism which is of the block mold type, is shown more specially in Figures 2 and 41. The mold table drive gear 40 is carried by the lower portion of the mold table 101 which is supported upon the ball-bearing 102 and is mounted to rotate around the column 35. At suitable intervals around the mold table, mold stations are mounted at 60 degree intervals so that in the present construction there are six stations. These stations are all duplicate mechanisms so that in describing the several mold elements only one station need be referred to, it being understood that the same elements are duplicated at each of the other five stations. The press or parison molds are arranged in guides 104 that are provided in the skirt of the mold table and these molds are adapted for vertical movement. The press mold construction comprises a carrier frame 105 in which is mounted a base block 106 that is held in position in a socket in the carrier frame by stub screw 107. The base block is connected by means of ring 108 to the block mold 109 which is provided with a mold opening 110 of the form desired for the glass and is also provided with a recess 111 which is adapted to receive the ring mold which will later be described. The block mold 109 is provided with a lift pin 112 that is operated by an actuating rod 114 that is normally retained in lower position by a suitable spring 115. The lower part of the carrier frame is provided with a carriage roller 116 which is adapted to roll on an annular cam track 117 as the mold table continuously rotates. This annular cam track causes the press molds to be raised and lowered during the rotation of the mold table and in Figure 2 the press mold on the right of the figure is in its highest position while the press mold on the left is in the lowest position. In order to insure the press mold being retracted at the proper time a retracting cam 118 is provided adjacent that portion of the annular track where the mold descends so that in case of sticking of the parts the mold is positively drawn downwardly. The actuating rod 114 is provided with a small cam roller 119 which engages the adjustable lever cam 120 which is set at the point where the parison mold starts to descend and at the proper time operates the actuating rod 114 to raise the lifter pin 112 and prevent the glass from sticking in the press mold when the mold descends. From the foregoing it will appear that the press molds may be easily detached from the carrier frame whenever it is desired to change the molds.

Split ring neck mold.

When the press mold is raised to its highest position the split ring mold shown more specially in Figures 2, 26 and 27, is seated in the recess 111. This split ring mold, which forms the lower portion of the neck of the ware, and which supports the pressed charge when the press mold is lowered, comprises a pair of arms 201 and 202 on the outer end of which is formed the ring mold proper. The upper face of these arms is recessed at 203 to provide an interlock for the solid ring mold. These arms are pivoted on stub bolts 204 that are secured to the ring mold frame 205 that comprises a bracket which is L-shaped in cross section and which is mounted to rotate with the mold table as will be more specifically explained later. The stub-bolts 204 are removable whenever it is desired to change the split ring molds.

Referring to Figure 26, it will be noted that the outer corners of the arms 201 and 202 are connected by spring links 206 and 207 with the side block 208 (Figs. 2 and 26) which carries a roller 209 that travels in the cam groove 210 (Figs. 2, 26, and 27) in the ring mold cam 211, which is maintained against rotation relatively to the column 35 by means of the key 212 which slides in a keyway in the column 35. This ring mold cam and the whole of the ring mold structure is adapted to be raised and lowered in order to accommodate the machine to the manufacture of ware of different heights. This raising and lowering is accomplished by means of a large geared nut 214 which engages the threads 215 on the column 35. The gear member of the nut 214 engages a pinion 216 which is mounted to rotate in a sleeve carried by the ring mold cam 211, and this pinion is provided with an opening to receive the end of a squared shaft so that when the shaft is inserted and turned by a crank or hand wheel the large nut 214 will be turned on the threads 215 and since the upper end of this nut comprises the supporting member for the large ring mold cam and associated parts all of these parts will be raised and lowered as desired.

From the foregoing description and an inspection of Figures 2, 26 and 27 it will be clear that the split ring mold is positively actuated by the links 206 and 207 to open the mold and is spring actuated to close the same and that this mold is closed at all of the stations with the exception of station 5, where the ware is removed from the press.

The ring mold frames 205 are mounted on slides 217, (Figs. 1, 2) which cooperate with guide plates 218 that are secured upon the legs of the spider 219 which legs are bolted to the mold table 101. These slides 217 facilitate the raising and lowering of the parts, as has previously been set forth.

Solid ring mold.

The solid ring molds (Figs. 1, 2 and 43) comprises a solid piece of metal 301 set in the outer end of the ring mold frame 205 in such manner that the axis of the opening in the ring 301 is coincident with the axis of the press mold. As the press mold is raised against the split ring mold the solid ring mold 301 is lowered into the recess 203 provided in the upper portion of the split ring mold so that the parts are tightly interfitted. This lowering of the solid ring mold is accomplished by a slight vertical movement of the ring mold frame 205 by means of the roller 302 which travels in the annular cam groove 304, (Figs. 2 and 43) so that as the mold table continuously rotates the solid ring mold 301 remains in a position over the split ring until after the blowing operation is completed and the cooling operation is begun, and until the ware is ready to be removed from the blow mold. By inspection of Figure 43 it will be noted that the ring mold is in depressed position for the first four stations and is in a raised position for stations E and F.

Feeder and draw-back mechanism.

In order that the description of the machine may follow its cycle of operations, it should be stated that the feeding of the glass occurs at station B after the press mold has been raised in position against the split ring and solid ring molds. It therefore is necessary to refer now to the feeding mechanism and more specially to Figures 1, 3, 6, and 44. When the machine is moved forward for operation the machine is in position to receive glass from a suitable feeder mechanism which may comprise a spout 401 having a bushing 402 through which glass periodically issues and is severed by shears 404 to drop as a lump charge into the mold. During the mold charge the bushing is covered by a flaming cup 405. The feeder mechanism is controlled by a control box 406 that is driven by the silent chain 68 referred to in connection with the feeder drive and shown in Figure 3.

When it is necessary to start the machine the main control hand lever 25 is operated to move the clutch lever 20 (Figs. 1, 3, and 6) to throw in the disk clutch for driving the machine and to throw out the positive clutch to drive the feeder. This control lever 25 operates an air control valve 407. Air is admitted to this valve 407 by the air line 408 and enters the middle portion of a balanced piston valve 409. When the control lever 25 is in the position shown in Figure 6 air from the air line 408 passes through the balanced valve into the pipe line 410 through the valve 411 and into the left end of the air cylinder 412 which is carried by the main base frame 2. The air fills the cylinder and drives the piston 414 outwardly since the piston is secured to the pushing rod 415 which is adjustably connected to the anchor 416 by means of hand wheels 417 and 418. During this operation the press will be moved forwardly under the glass feeder. When the main control lever 25 is swung to the left to operate the disk clutch to stop the press, then air from the air line 408 enters the pipe line 419 drives the cut-off valve 420 open and admits air to the right end of the cylinder 412. This causes the cylinder to telescope relatively to the piston 414 and withdraws the machine from beneath the feeder. Obviously during these movements of the machine the truck wheels 70 roll on the tracks 71. As the piston 414 approaches the left end of the cylinder the spring stop 421 engages the cut-off valve 411, which traps air between the left end of the cylinder and the piston 414 so that the machine comes to rest against an air cushion. The cut-off valve 420 is in a similar manner actuated by the spring stop 422 when the parts are moving into the position shown in Figure 6. Until the cut-off valves 411 and 420 operate, the air back of the piston escapes through the balance valve 409 and the passageway 424 to the exhaust pipe 425. When the press is withdrawn from beneath the feeder, the feeder will be driven through the positive clutch drive mechanism as has previously been explained and consequently will function as though it were feeding glass to the machine, but the charges of glass are permitted to fall through the opening 426 in the floor 427 and into suitable receptacles beneath the floor. The arrangement of the feeder over the opening in the floor and feeder mechanism per se do not form a part of the present invention and are only described in general terms as incidental to the present machine in order that the parts may be clearly understood in all of their associated and combined relations.

Mold feed funnel.

In view of the fact that the mold table and connected parts continuously rotate and the feeder for the glass is stationary it is desirable to provide devices to guide the glass into the press molds. This operation is accomplished by an oscillating funnel which moves for a time with the press mold, as the press mold passes beneath a feeder bushing, and after the mold has passed beyond the feed station the funnel quickly moves in the opposite direction to the movement of the table and assumes a position over the next succeeding mold as more fully described in the parent application Serial No. 553,900. As shown in Figs. 1, 2, 18, 19 and 20, a head frame 501 is solidly bolted on the upper end of the colum 35 and carries a bearing 502 in which an arm shaft 504 is adapted to oscillate. The upper end of the vertical main shaft 34 carries an arm cam 505. A roller 506 on an upper arm 507 engages a cam groove 508 in the arm cam 505 and since the upper arm cam 507 is keyed to the shaft 504, this shaft will be oscillated when the cam 505 is rotated. This cam makes one complete rotation for each charge of glass fed so that the connected parts driven by this cam perform one cycle for each charge fed or six cycles for each rotation of the mold table. A lock ring 520 is carried by the upper portion of the spider 219 and therefore rotates with the mold table. The outer edge of this lock ring comprises a track 521 and forms the support for steadying rolls 522 which are carried by the swinging frame to assist in supporting the outer end of the frame. This lock ring is provided with lock bushings 524 which are located 60 degrees apart so that there is one bushing for each mold station upon the mold table. A lock pin 525 extends through the swinging frame 511 and is raised and lowered by a sliding head 526 which carries a roller 527 that travels in a lock pin groove 528 in the vertical wall of the arm cam 505. The arm groove 508 which operates the swinging arms is so timed with reference to the lock pin groove 528 that the lock pin 525 is forced into a lock bushing 524 each time the funnel 517 is directly over the solid ring mold and is traveling with the mold during the time when the funnel is adapted to guide a charge of glass into a press mold beneath the solid ring mold.

The diagrammatic view Fig. 21 illustrates the movement of the funnel and the swinging arm and the pressing mechanism due to the rotation of the arm cam 505.

*Pressing mechanism.*

After the glass charge has dropped from the feeder through the funnel into the pressing mold the pressing operation is then performed on the glass. This mechanism is illustrated more specially in Figures 2, 7 to 10, 13 to 18, 22 to 24, 25 and 31. A pressing cylinder 601 is mounted on the outer end of the swinging frame 511 and is so positioned that when the lock pin 525 is in a lock bushing 524 and the funnel 517 is directly over a solid ring mold 301 to receive the glass, the axis of the pressing cylinder 601 is directly over the next preceding mold. This piston rod for pressing the glass extends through the cylinder 601 and is formed in two parts, the upper part 602 is screw threaded on a rod 604 that is connected with the lower part 605. The upper piston rod comprises a tubular sleeve which carries the upper piston 606. This tubular sleeve may be adjusted on the rod 604 and thereby adjust the distance between the upper piston 606 and the lower piston 607 which is locked on the lower part 605 of the piston rod. In this manner the length of stroke of the pressing plunger may be regulated and also the quantity of air used in the cylinder may be adjusted. The lower piston rod extends downwardly and carries a sleeve 608 on which is mounted sliding pins 609 that are connected with a pressure ring 610 which is adapted to apply spring pressure to the solid ring mold when the plunger descends, due to the fact that the pressure ring 610 contacts with the upper portion of the solid ring mold 301 and thereby securely clamps the parts during the pressing operation. The plunger (Fig. 8) comprises a head 611 which is hollow and which is adapted to be locked upon a boss 612 that is provided with water conduits 614 and 615, with a pipe 616 extending from the water conduit 614 so that cooling water may be circulated through the plunger to maintain the same at a proper temperature. A lock ring 617 locks the plunger head against the boss in such manner that the plunger head may be changed whenever it is desired.

The outgoing water conduit 615 carries a thermometer 618 (Figs. 1 and 7) and the incoming water conduit 614 is provided with a control valve 619. By increasing or diminishing the flow of water through the plunger head the temperature may be noted on the thermometer and may be regulated as desired so that the plunger may be at all times maintained under correct heat conditions.

Attention is now directed to Figures 2, 7 to 10, 13 to 19, and 22, 23 and 24. An adjustable cam 620 is mounted on the head frame 501 and carries a worm wheel 621 which cooperates with the worm 622 (Figs. 22, 23 and 24) that is connected with the stub shaft 624 which carries bevel gear 625 that meshes with the bevel gear 626 on the pressing control shaft 627 and which is provided on the outer end with a hand wheel 628. An indicator 629 is provided with a needle 630 which is geared to the control shaft 627 and indicates the advancing or retarding of the adjustable cam when the hand wheel is turned to rotate the control shaft 627. This adjustable cam carries a cam member 631 which is held in position by screws 632. This cam member cooperates with the end of a trip mechanism which controls the air to the pressing plunger. The trip mechanism is carried on a frame 634 which is secured to the swinging frame 511 and comprises a rod 635 provided with two superimposed rollers 636 one of which engages the cam member. This rod carries a central collar 637 through which extends a sleeve 638 adjacent the rod. The sleeve is provided on each end with collars 639 and 640. Springs 641 and 642 extend between the central collar 637 and the end collars 640 and 639 respectively. Spring pressed latch members 644 are mounted on the frame 634 with the head 645 of these members adjacent the collars 639 and 640 respectively and with the inwardly extending arms 646 adjacent the central collar 637. The sleeve extends through the bearing 647 on the frame 634 and is connected with the valve actuating arm 648. An initiatory cam 649 is fastened to the under part of the arm cam 505 and as the arm cam rotates, making one rotation for each charge of glass, the initiatory cam 649 engages one of the rollers on the end of the rod 635 and draws the rod inwardly. This causes the central collar 637 to strike the inner arm of the dog holding the collar 640. When this occurs the sleeve 638 is quickly pulled inwardly by the compressed spring 641 which is now released. This operation drives the balanced valve 650 inwardly to the position shown in Figure 16. Air is supplied to the middle conduit 651 from the air supply 652 and when the valve is in the position shown in Figure 16 the air flows into the pressing air pipe 654, which is provided with two branches. The branch 655 leads through the reducing valve 656 and directly in the upper end of the pressing cylinder 601. The reducing valve may be adjusted and set to deliver air at a predetermined pressure to the pressing cylinder. A pressure gage 657 is arranged on this pipe and shows the predetermined pressure of the air delivered to the pressing cylinder during the pressing operation. When air enters through the reducing valve 656 into the cylinder 601 the piston is driven downwardly for pressing the glass charge in the press mold. The branch 658 is provided with a check valve 653 which prevents air pressure from going into the cylinder through this branch but which operates to permit air pressure to leave through the branch when the piston is raised by air pressure introduced underneath the piston as will now be described.

During the pressing operation the lock pin 525 is in the lock bushing 524 and the swinging frame 511 is traveling with the mold table 101. Since the frame 634 is mounted upon the swinging frame 511, one roller 636 is swept over the adjustable cam member 631 which moves the rod 635 outward and releases the outer catch so that the sleeve 638 moves the valve actuating arm 648 outwardly to draw the balanced valve 650 to the position shown in Figures 11 and 14. This admits air to the lift pipe line 659 through the adjustable reducing valve 660 and into the lower end of the cylinder 601, and thus quickly lifts the piston and the plunger upwardly. As the piston rises the air in the upper end of the cylinder is expelled through the branch pipe 658 to the balanced valve 650 and out through the exhaust port 661. This movement has carried the inner collar outwardly beyond the head of the inner latch so that as the frame 634 continues to move in a clockwise direction the head 662 passes over the beveled portion of the cam 663. This cam pushes in the head 662 against the action of its spring thereby suspending the exhaust of air through ports 661 from the upper end of the pressing cylinder. This causes the residual air in the upper end of the pressing cylinder to act as a cushion to arrest ascent of the piston and plunger. The parts are now ready for the next cycle of pressing operation. It is apparent from the foregoing description and from Figs. 2, 13 and 15 that the cam 649, which is attached to the lower edge of the funnel cam 528 (Fig. 2), acts to initiate the descent of the pressing plunger while the cam surface 632, which is attached to the cam 620, initiates the raising of the pressing plunger. The cam 649 being attached to the funnel cam 538 makes one complete revolution for each charge of glass and hence causes the plunger to descend every time a mold arrives at the pressing station. As shown in Fig. 2, the cam 620 is attached to worm 621 and is angularly adjustable about the central column to provide an adjustment for turning the commencement of the raising of the plunger. This mechanism including cam 649, which initiates the descent of the plunger, and adjustable cam 620, which initiates the ascent of the plunger constitutes devices by means of which the zone of operation of the pressing plunger may be adjusted, i. e. the time or angle of rotation of the mold table through which the pressing plunger is held in the mold.

The lift pipe line 659 is provided with a branch line 666 which is provided with a check valve 673 that permits air to exhaust from the lower end of the cylinder through the branch line without going back through the reducing valve in the main lift line 659. This branch functions on the down stroke of the piston.

The air from the exhaust port 661 from the upper part of the cylinder 601 exhausts into a line 667 which leads to the tangential slot 519 that opens into the funnel 517. This escaping air may be charged with an oil or fluid vapor by means of the slight lubricator 668 that leads oil to the cylinder 601 so that where it is desirable an oily vapor may be admitted to the interior of the funnel. The exhaust air from the lower part of the cylinder 601 is expelled through exhaust port 669 into a line 670 that leads to the space 518 between the walls of the funnel 517 so that the funnel is cooled during each pressing operation. A hand lever 671 is connected to the valve actuating arm 648 so that the valve may be hand operated whenever desired.

During the operation of the machine it might be desirable to quickly raise the plunger. To this end an operator's valve 672 is connected directly to the main air line 674, and air normally passes through this valve into the air supply pipe 652 to the balanced valve 650. However, if an emergency arises the operator pushes in the operating knob 675 on the operator's valve 672 and diverts the air into the emergency line 676 which opens the check valve 677 and permits air to quickly flow into the plunger lift line 659. This action of the operator's valve 672 also cuts off the supply of air through the line 652 so that the plunger will be quickly raised when this valve 672 is operated.

When the pressing operation is completed and the pressing mold 109 starts to descend, the lift pin 112 acts to sustain the pressed charge and also to admit air into the bottom of the mold to prevent formation of a vacuum therein as the charge is lifted. This pin 112 is sufficiently spaced from the mold walls to also permit the escape of air when the charge is dropped into the mold.

A detailed description of the blow mold, the blowing mechanism and the take-off mechanism as set forth in the parent application Serial No. 553,900 is believed to be unnecessary in this divisional application as none of the claims herein are directed to those features.

From the foregoing description and drawings it will appear that the present machine is relatively simple in construction and operation and is exceedingly flexible as to adjustments during operation and as to changes necessary to make different types of ware. The controls are all centered at one station where the operator may control the whole operation of the machine without moving from the station, and the continuity of operations renders the control adjustments easy to make.

Having thus described my invention, what I claim is:

1. In a machine of the class described; the combination of a continuously rotating mold table; press molds carried by said table; means to slide said mold vertically on said table; and pressing means adapted to move with said mold table during the pressing operation, the same pressing means being operative to successively press charges in a plurality of said molds.

2. In a machine of the class described; the combination of a continuously rotating mold table; press molds carried by said table; means to slide said molds vertically on said table; blow molds adapted to swing to enclose the axes of the press molds; and pressing means adapted to move with said mold table during the pressing operation, the same pressing means being operative to successively press charges in a plurality of said molds.

3. In a machine of the class described; the combination of a continuously rotating mold table; press molds carried by said table; and pressing means adapted to move with said mold table during the pressing operation, the same pressing means being operative to successively press charges in a plurality of said molds.

4. A machine according to claim 3 wherein the pressing means comprises a cylinder provided with a pair of piston members and adjustment devices for adjusting the distance between said members.

5. A machine according to claim 3 wherein the press molds are fed by a stationary feeder and guiding means is provided to travel with a mold to guide charges into the same.

6. In a machine of the class described a base frame, a variable drive mechanism carried by said base frame, a vertical column, a vertical shaft within said column, a mold table continuously rotatable around the base of said column, press molds carried by the table, pressing mechanism mounted to oscillate around the head of said column, and cam means on the upper end of said shaft to control the oscillation of said pressing mechanism.

7. In a machine of the class described a base frame, drive mechanism carried by said base frame, a vertical column, a vertical shaft within said column, a mold table rotatable around the base of said column, press molds carried by the table, pressing mechanism mounted to oscillate around the head of said column, and cam means on the upper end of said shaft to control the oscillation of said pressing mechanism.

8. A machine according to claim 7 and wherein gearing is provided to drive the said shaft so that during one revolution of the mold table the said shaft has completed as many revolutions as there are mold stations on the mold table.

9. A machine according to claim 7 and wherein adjustable stationary cam means is provided to control the duration of the pressing operation.

10. A machine according to claim 7 wherein the pressing mechanism comprises a plunger, and means to regulate the temperature of the plunger.

11. A machine according to claim 7 wherein are provided means under control of the operator to render the pressing mechanism inoperative to perform the pressing operation when desired and without stopping the machine.

12. In a glass machine, a revolving table, molds upon said table, pressing mechanism, means to automatically operate said pressing mechanism as said table revolves, and devices comprising a worm gear for adjusting the zone of action of the pressing mechanism.

13. In a glass machine, a revolving table, molds upon said table, pressing plunger operative upon a mold charge, a trip controlled spring actuated air control valve automatically to operate said pressing plunger as said table revolves and means for operating a trip.

14. In a glass machine, a revolving table, molds upon said table, a pressing plunger operative upon a mold charge, means comprising a spring trip air valve to admit air to a pressing cylinder automatically to operate said pressing plunger as said table revolves, and an adjustable cam for operating said spring trip.

15. In a glass machine, a revolving table, pressing mechanism comprising an air cylinder with pipe lines connected with the said cylinder, one of said pipe lines being adapted to admit air to one end of said cylinder and the other of said pipe lines being adapted to carry exhaust air from the same end of said cylinder, means automatically to operate said pressing mechanism as said table revolves, and devices for adjusting the zone of action of the pressing mechanism.

16. In a glass machine, the combination of a revolving table, molds upon said table, pressing mechanism comprising an air cylinder with pipe lines connected with each end of said cylinder, one of said pipe lines on each end being adapted to admit air to said cylinder and the other of said pipe lines being adapted to carry air from said cylinder, a check valve in the exhaust line and a reducing valve in the admission line.

17. In a glass machine, a revolving table, molds upon said table, pressing mechanism, means to automatically operate said pressing mechanism as said table revolves, and devices comprising a stationary cam, and hand-operated controls to adjust said cam to retard or hasten the operative action of said cam for adjusting the zone of action of the pressing mechanism.

18. In a glass machine, a rotatable mold table, a pressing mechanism rotating with said table during the pressing operation, a locking ring at all times rotatable with said table, and automatically operated means to lock said pressing mechanism to said ring during the pressing operation.

19. In a glass machine, a rotatable mold table, a pressing mechanism, a cam for moving said mechanism with said table during the pressing operation, a locking ring at all times rotatable with said table, and automatically operated means to lock said pressing mechanism to said ring during the pressing operation, said means comprising a locking pin operated by a cam upon the same shaft as the cam which moves the pressing mechanism with the mold table.

20. In a machine of the class described; a continuously rotating mold table; a plurality of press molds on said table; means for elevating said molds at intervals; and mechanism for pressing charges in said molds, said mechanism being oscillatory to enable it to cooperate with successive molds.

21. A machine according to claim 20 wherein the molds are mounted in slides along the edge of said table.

22. A machine according to claim 20 wherein said elevating means comprises a circular cam.

23. A machine according to claim 20 wherein said mechanism for pressing charges is automatically locked at intervals to turn with said mold table.

24. A machine according to claim 20 wherein said mechanism for pressing charges oscillates as many times per revolution of said mold table as there are molds on said table.

25. A machine according to claim 20 wherein said mechanism for pressing charges comprises a fluid actuated plunger.

26. A machine according to claim 20 wherein said mechanism for pressing charges comprises a fluid actuated plunger and means for cooling said plunger.

27. A machine according to claim 20 wherein a revoluble cam imparts the oscillatory movement to said pressure applying mechanism.

28. In a machine of the class described; a continuously rotating mold table; a plurality of molds on said table; means for elevating said molds at intervals; a pressure plunger; and means to apply pressure on said plunger while said molds are elevated, the same plunger being operative to successively press charges in a plurality of molds.

29. In a machine of the class described, the combination of a rotating mold table, press molds carried by said table, a pressing plunger adapted to move with said mold table during the pressing operations and to move in the opposite direction thereafter and an adjustable means for determining the duration of the pressing operation.

30. In a machine of the class described, the combination of a rotating mold table, press molds carried by said table, a pressing plunger adapted to move with said mold table during the pressing operation, an adjustable cam for determining the duration of the pressing operation, and means for adjusting said cam while the machine is in operation.

31. In a machine of the class described, the combination of a rotating mold table, press molds carried by said table, a pressing plunger adapted to move with said mold table during the pressing operation and in the opposite direction thereafter, and an annular rotating track acting as a supporting means for said pressing plunger.

32. In a machine of the class described, the combination of a rotating mold table, press molds carried by said table, a pressing plunger laterally movable with respect to said table, and automatically operated locking devices to lock the pressing plunger and the mold table to rotate together during the pressing operation.

33. In a machine of the class described, the combination of a continuously rotating mold table, press molds carried by said table, a pressing member adapted to oscillate laterally of itself in a path above the path of the press molds and to engage charges in successive molds, and means controlling the time of such oscillations.

34. In a machine of the class described, a vertical column, a rotating table carried by said column, press molds carried by said table, pressing means adapted to move with said mold table during the pressing operation, a cam supported by said columns and adapted to oscillate the pressing means, and a shaft extending through said column and operatively connected with said cam.

35. In a machine of the class described, a rotatable mold table, a plurality of molds associated with said mold table, a pressing plunger pivoted coaxially with said mold table to press charges in said molds, said plunger being rotatable with respect to said mold table, and intermittently operated means to rotate said pressing plunger with respect to the mold table and at the same angular velocity as said mold table.

36. In a machine of the class described, a rotatable mold table, a plurality of molds associated with said mold table, a pressing plunger rotatable with respect to said mold table to press charges in said molds, and intermittently operated means to lock said pressing plunger in fixed angular position with respect to said mold table whereby said pressing plunger rotates at the same angular velocity as said table and operates upon a plurality of molds.

37. In a machine of the class described, means to move a series of molds through the same path, a single pressing plunger to press charges in a plurality of said molds, and means to intermittently maintain said pressing plunger in fixed position with respect to a rotating mold in which a charge is being pressed.

38. In a machine of the class described, a hollow vertical column, a mold table rotatable about said column, molds associated with said mold table, means rotatable about said column to press charges in said molds, a cam for controlling the movement of said pressing means, and a shaft within said column adapted to impart movement to said cam.

39. In a machine of the class described, a hollow vertical column, a mold table rotatable about said column, molds associated with said mold table, means rotatable about said press column to press charges in said molds, a cam for controlling the rotary movement of said pressing means, a vertical shaft within said column for transmitting motion to said cam, and common means to drive said mold table at one speed and said vertical shaft at another speed.

40. In a machine of the class described; a vertical column; a mold table rotatable about said column; molds associated with said mold table, means rotatable about said column to press charges in said molds; a member rigidly associated with said mold table, said member having a series of circularly disposed holes, a locking pin associated with said pressing means, and a cam adapted to insert said locking pin into said holes to lock said pressing means in fixed angular position with respect to said mold table.

41. In a machine of the class described, a power cylinder, a piston within said cylinder, a supply of fluid under pressure, valve means to normally control the admission and discharge of pressure fluid to said cylinder, and a device for rendering said valve means ineffective and admitting pressure fluid to said cylinder to move said piston to a predetermined position.

42. In a machine of the class described, a pair of pressing members, a power cylinder and piston for actuating at least one of said pressing members, a supply of pressure fluid, valve means for normally controlling the admission of pressure fluid to said cylinder to manipulate at least one of said pressing members, and safety means comprising a manually operable valve adapted to divert the supply of pressure fluid from said valve means and to admit fluid directly to said cylinder to separate said pressing members.

43. In a glass machine a mold table, molds upon said table, a pressing plunger, a compressed air operated piston to operate said plunger, means to automatically control the air to operate said piston, and safety means under control of the operator to manually control said compressed air to separate said plunger and mold whenever desired.

44. A machine of the class described comprising in combination a mold member; a plunger to press glass in said mold member; air air cylinder; piston devices in said cylinder, and operatively connected to said plunger to operate the same, said piston devices comprising a piston member carried by one section of a piston rod and a piston member carried by another section of a piston rod; and means to adjust one section relatively to the other to adjust the air capacity of the cylinder.

45. In a machine of the class described, a pivoted frame, a valve carried by said frame, said valve having at least two positions, a travelling cam for putting said valve in one position, and a stationary cam adapted to put said valve in another position as said frame swings with respect to said cam.

46. In a machine of the class described, the combination of a continuously rotating mold table, press molds carried by said table and pressing plunger adapted to oscillate for pressing charges in the molds as they pass the pressing station.

47. In a machine of the class described, the combination of a continuously rotating table, press molds carried by said table, and a pressing plunger adapted to move with said mold table during the pressing operation, the same pressing plunger being operative successively to press charges in a plurality of said molds.

48. In a glass machine the combination of a rotatable mold table, a charge pressing plunger adapted to rotate with said table during the pressing operation and to rotate in the opposite direction thereafter to a position over another mold, and automatically operated means to lock said pressing plunger in proper position over a mold when rotating with said table.

49. In a machine of the class described, a continuously rotating mold table, a plurality of molds on said table, said molds having an aperture in the lower ends thereof, lift pins projecting through said apertures, means for elevating said molds at intervals, a pressing plunger for operating successively upon the charges in said molds, means for lowering said molds, and means to operate said pins as said molds begin to descend.

50. In a glass machine, the combination of a valve for effecting the pressing operations therein, a first spring capable of moving said valve to one position to effect operation of the pressing mechanism, a second spring for moving said valve to another position to raise said pressing mechanism, and means to release the first spring to permit it to move said valve and to compress said second spring to place it in readiness to move said valve to another position.

51. In a machine of the class described, the combination of a continuously rotating table, press molds associated with said table and a pressing plunger arranged to travel with the molds during the pressing operation and in the opposite direction during the intervals between pressing operations.

MAX JAEGER.